United States Patent [19]
Kimura et al.

[11] Patent Number: 5,439,656
[45] Date of Patent: Aug. 8, 1995

[54] METHOD FOR THE PREPARATION OF A RARE EARTH OXIDE POWDER

[75] Inventors: Yuji Kimura; Shigeru Sakai, both of Fukui, Japan

[73] Assignee: Shin-Etsu Chemical Co., Ltd., Tokyo, Japan

[21] Appl. No.: 227,323

[22] Filed: Apr. 14, 1994

[30] Foreign Application Priority Data

Apr. 27, 1993 [JP] Japan ................................. 5-101104

[51] Int. Cl.$^6$ ............................................. C01F 17/00
[52] U.S. Cl. ..................................... 423/21.1; 423/263
[58] Field of Search ............................... 423/21.1, 263

[56] References Cited

U.S. PATENT DOCUMENTS

| | | | |
|---|---|---|---|
| 2,394,586 | 2/1946 | Ballard et al. | 423/263 |
| 3,441,512 | 4/1969 | Durkee | 423/263 |
| 3,692,671 | 9/1972 | Recht et al. | 423/21.1 |
| 4,238,467 | 12/1980 | Dugan et al. | 423/263 |
| 4,497,785 | 2/1985 | Tilley et al. | 423/263 |

FOREIGN PATENT DOCUMENTS

| | | | |
|---|---|---|---|
| 295611 | 11/1991 | German Dem. Rep. | 423/263 |
| 298763 | 3/1992 | German Dem. Rep. | 423/263 |
| 2915396 | 10/1979 | Germany . | |

OTHER PUBLICATIONS

Nagashima, Ki et al., "The Synthesis of Crystalline Rare Earth Carbonates" Bull. of the Chem. Soc. of Japan, vol. 46, pp. 152–156, 1973, no month.

*Primary Examiner*—Steven Bos
*Attorney, Agent, or Firm*—Wenderoth, Lind & Ponack

[57] ABSTRACT

An improved method is proposed for the preparation of a powder of a rare earth oxide having good dispersibility containing no agglomerates of particles even without undertaking disintegration indispensable heretofore. The improved method comprises precipitation of a rare earth carbonate by the admixture of an aqueous solution of an inorganic rare earth salt with an aqueous solution of ammonium hydrogen carbonate in an excess amount over the stoichiometrically equivalent amount to give a slurry of the rare earth carbonate which is subjected to heating treatment in two steps each under specified conditions to effect aging of the carbonate precipitates. Characteristically, the aqueous slurry after the first aging treatment is subjected to an adjustment in three differently specified ways prior to the second aging treatment including, first, admixture of an additional amount of ammonium hydrogen carbonate, second, addition of water to decrease the solid content in the slurry and, third, addition of an inorganic acid to decrease the pH of the slurry.

3 Claims, No Drawings

METHOD FOR THE PREPARATION OF A RARE EARTH OXIDE POWDER

BACKGROUND OF THE INVENTION

1. Field of the Invention

The present invention relates to a method for the preparation of a powder of a rare earth oxide or, more particularly, to a method for the preparation of a powder of an oxide of a rare earth element consisting of particles having excellent dispersibility without agglomeration to be useful as a base material of a sintered ceramic body of a rare earth oxide or as a sintering aid of various kinds of ceramic materials such as silicon nitride, aluminum nitride and the like.

2. Description of the Related Art

In the prior art, an oxide powder of a rare earth element is conventionally prepared by the process in which an aqueous solution of an inorganic salt of the rare earth element is admixed with a water-soluble precipitant such as carbonates, oxalic acid or oxalates, hydroxides and the like to give a water-insoluble compound of the rare earth element such as a carbonate, oxalate, hydroxide and the like, respectively, and the precipitates of the water insoluble rare earth compound are collected by filtration, washed with water, dehydrated and dried and finally calcined so as to thermally decompose the rare earth compound into an oxide powder. It is unavoidable in this prior art method that the particles of the rare earth oxide cause agglomeration to form lumps or granules sometimes having a dimension of several millimeters. Therefore, disintegration of such agglomerates of the rare earth oxide particles is indispensable when the oxide powder is to be used in the above mentioned applications. A problem in conducting disintegration is that, even by undertaking the disintegration in a wet process by the addition of a wetting liquid and a dispersion work aid, fully dispersible rare earth oxide particles can hardly be obtained with a substantial amount of coarse particles or agglomerates even after a prolonged disintegration work which must be removed by screening so that the cost for the preparation of a rare earth oxide powder is necessarily increased.

SUMMARY OF THE INVENTION

The present invention accordingly has an object to provide an improved method for the preparation of a powder of a rare earth oxide having good dispersibility of the particles without agglomeration even when the disintegration procedure is omitted.

In a first aspect of the invention, the method of the present invention for the preparation of a powder of a rare earth oxide comprises the successive steps of:

(a1) admixing an aqueous solution of an inorganic salt of the rare earth element with an aqueous solution of a water-soluble alkaline carbonate in a concentration of 5 to 25% by weight in an amount of the alkaline carbonate in excess by from 20 to 100% over the stoichiometrically equivalent amount to effect complete precipitation of the rare earth ions in the aqueous solution of the inorganic rare earth salt to form an aqueous slurry of a carbonate of the rare earth element at a temperature in the range from 0° to 50° C.;

(b1) heating the aqueous slurry containing the precipitates of the rare earth carbonate at a temperature of 50° C. or higher or, preferably, in the range from 55° to 65° C. for at least 60 minutes or, preferably, for 3 to 6 hours;

(c1) admixing the aqueous slurry after step (b1) with an aqueous solution of the inorganic salt of the rare earth element in an amount in the range from one fifth to a half of the amount contained in the aqueous solution in step (a1);

(d1) heating the aqueous slurry after step (c1) at a temperature of 60° C. or higher or, preferably, in the range from 80° to 95° C. for at least 60 minutes or, preferably, for 3 to 6 hours; and (e1) subjecting the aqueous slurry after step (d1) to solid-liquid separation to collect the precipitates of the rare earth carbonate and washing with water, drying and calcination of the rare earth carbonate.

In a second aspect of the invention, the inventive method comprises the successive steps of:

(a2) admixing an aqueous solution of an inorganic salt of the rare earth element in a concentration of at least 0.2 mole/liter relative to the rare earth ions with an aqueous solution of a water-soluble alkaline carbonate in a concentration of 5 to 25% by weight in an amount of the alkaline carbonate in excess by from 20% to 100% over the stoichiometrically equivalent amount to effect complete precipitation of the rare earth element in the aqueous solution of the inorganic salt thereof to form an aqueous slurry of a carbonate of the rare earth element at a temperature in the range from 0° to 50° C.;

(b2) heating the aqueous slurry containing the precipitates of the rare earth carbonate at a temperature of 50° C. or higher or, preferably, in the range from 55° to 65° C. for at least 60 minutes or, preferably, for 3 to 6 hours;

(c2) admixing the aqueous slurry after step (b2) with water in such an amount that the content of the rare earth carbonate therein does not exceed 0.05 mole/liter calculated as the rare earth element;

(d2) heating the aqueous slurry after step (c2) at a temperature of 60° C. or higher or, preferably, in the range from 80° to 95° C. for at least 60 minutes or, preferably, for 3 to 6 hours; and (e2) subjecting the aqueous slurry after step (d2) to solid-liquid separation to collect the precipitates of the rare earth carbonate and washing with water, drying and calcination of the rare earth carbonate.

Further, according to a third aspect of the invention, the inventive method comprises the successive steps of:

(a3) admixing an aqueous solution of an inorganic salt of the rare earth element with an aqueous solution of a water-soluble alkaline carbonate in a concentration of 5 to 25% by weight in an amount of the alkaline carbonate in excess by from 20% to 100% over the stoichiometrically equivalent amount to effect complete precipitation of the rare earth element in the aqueous solution of the inorganic rare earth salt to form an aqueous slurry of a carbonate of the rare earth element at a temperature in the range from 0° to 50° C. to give an aqueous slurry of the rare earth carbonate;

(b3) heating the aqueous slurry containing the precipitates of the rare earth carbonate at a temperature of 50° C. or higher or, preferably, in the range from 55° to 65° C. for at least 60 minutes or, preferably, for 3 to 6 hours;

(c3) admixing the aqueous slurry after step (b3) with an inorganic acid in such an amount that the aqueous slurry has a pH lower than 7.5 or, preferably, in the range from 5 to 7.5;

(d3) heating the aqueous slurry after step (c2) at a temperature of 60° C. or higher or, preferably, in the range from 80° to 95° C. for at least 60 minutes or, preferably, for 3 to 6 hours; and (e2) subjecting the aqueous slurry after step (d2) to solid-liquid separation to collect the precipitates of the rare earth carbonate and washing with water, drying and calcination of the rare earth carbonate.

DETAILED DESCRIPTION OF THE PREFERRED EMBODIMENTS

As is described above, the object of the present invention can be achieved by three different ways according to the first to third aspects of the invention. At any rate, the inventive method comprises the first step (a1), (a2) or (a3) in which an aqueous solution of an inorganic salt of the rare earth element is admixed with an aqueous solution of an alkaline carbonate to precipitate the rare earth ions in the form of a rare earth carbonate forming an aqueous slurry and, in the second step (b1), (b2) or (b3), the thus obtained aqueous slurry is heated at a specified temperature for a specified length of time to effect aging of the precipitates of the rare earth carbonate. Characteristically, the aqueous slurry after the aging treatment is subjected to a second aging treatment in step (d1), (d2) or (d3) by heating the aqueous slurry at a specified temperature for a specified length of time but, prior to undertaking this second aging treatment, a certain adjustment of the aqueous slurry must be undertaken in step (c1), (c2) or (c3) in different ways according to the first to the third aspects of the invention. The step (e1), (e2) or (e3) is rather conventional to separate the precipitates of the carbonate from the slurry followed by washing with water, drying and calcination of the carbonate precipitates into a rare earth oxide powder.

In the following, the method of the present invention is described in detail according to the respective aspects of the invention.

In the inventive method according to the first aspect, an aqueous solution of an inorganic salt of the desired rare earth element is prepared. Needless to say, the inventive method is applicable to any one or to any combination of the rare earth elements including yttrium and the elements having atomic numbers in the range from 57 to 71 inclusive. Though not particularly limitative, an aqueous solution of an inorganic salt of the rare earth element can be prepared conveniently by dissolving an oxide or hydroxide of the rare earth element in a suitable inorganic acid which is preferably hydrochloric, sulfuric or nitric acid, of which nitric acid is more preferred when the residual amount of impurities derived from the anionic radicals of the acid in the oxide product should be minimized. The concentration of the thus prepared aqueous solution of the inorganic salt of the rare earth element or, preferably, the rare earth nitrate should be in the range from 0.1 to 1.0 mole/liter calculated as the rare earth ions. The aqueous solution can be either neutral or acidic as is the case when the inorganic acid to dissolve the rare earth oxide is used in an excess amount in order to ensure complete dissolution of the rare earth oxide in the acid. The concentration of the free acid in the aqueous solution is preferably in the range from 0.001 to 0.05 mole/liter.

In step (a1) of the inventive method, the above prepared aqueous solution of the inorganic rare earth salt or rare earth nitrate is admixed at a temperature in the range from 0° to 50° C. or, preferably, at room temperature under agitation taking 3 to 10 minutes with an aqueous solution of an alkaline carbonate which is preferably ammonium carbonate or ammonium hydrogen carbonate or, more preferably, ammonium hydrogen carbonate to precipitate the rare earth ions in the form of a rare earth carbonate. The concentration of the alkaline carbonate in the aqueous solution is in the range from 5 to 25% by weight or, preferably, in the range from 5 to 15% by weight.

It is essential in conducting this precipitation reaction of the rare earth carbonate in step (a1) that the amount of the alkaline carbonate admixed in the form of an aqueous solution with the aqueous solution of the inorganic rare earth salt is in excess over the stoichiometrically equivalent amount required to effect complete precipitation of the rare earth ions in the form of a carbonate. Preferably, the amount of the alkaline carbonate is in excess by at least 20% or, preferably, by from 30 to 80% over the stoichiometrically equivalent amount. When the aqueous solution of the inorganic rare earth salt is acidic containing a certain amount of free acid as is sometimes the case, the amount of the alkaline carbonate must be increased so much over the above mentioned amount by the amount required for the neutralization of the free acid. When the amount of the alkaline carbonate is too small, the oxide powder obtained by the calcination of the rare earth carbonate would be poorly dispersible due to increased agglomeration.

In step (b 1) of the inventive method to follow the above described step (a1) to obtain an aqueous slurry of the rare earth carbonate, the aqueous slurry is heated at a temperature of 50° C. or higher or, preferably, in the range from 55° to 65° C. for at least 60 minutes or, preferably, for 3 to 6 hours to effect aging of the precipitates of the rare earth carbonate. When the temperature is too low or the length of time is too short, the desired effect of aging is insufficient so that the rare earth oxide powder obtained by conducting the process would not have the properties as desired while no particular additional improvement can be obtained by increasing the temperature and/or the aging time to exceed the above mentioned upper limits. By properly undertaking this aging treatment of the aqueous slurry, growth of the precipitated carbonate particles takes place so that the extremely fine particles of the carbonate before aging are converted into relatively coarse particles having a particle diameter of, for example, 10 μm or larger which are crystallographically amorphous.

In step (c1) of the inventive method to follow the above described step (b 1) to effect aging of the precipitates of the rare earth carbonate in the aqueous slurry, an additional amount of the inorganic rare earth salt is admixed with the aqueous slurry at a temperature of 50° to 95° C. The additional amount of the rare earth salt is admixed in the form of an aqueous solution, of which the concentration can be the same as in step (a1). The amount of the rare earth salt additionally added to the aqueous slurry after step (b1 ) is in the range from one fifth to a half of the amount of the rare earth salt contained in the starting aqueous solution thereof but it is preferable that the amount does not substantially exceed the stoichiometric amount required to convert the excess of carbonate ions in the aqueous slurry into the rare earth carbonate.

The aqueous slurry of the rare earth carbonate obtained by the admixture of an additional amount of the inorganic rare earth salt is then subjected to a second aging treatment of the precipitates in step (d1) in which the aqueous slurry is heated at a temperature of 60° C. or higher or, preferably, in the range from 80° to 95° C. for at least 60 minutes or, preferably, for 3 to 6 hours to complete aging of the rare earth carbonate particles. This second aging treatment has an effect to convert the amorphous particles of the rare earth carbonate into fine particles of the carbonate having crystallinity.

The final step of the inventive method to follow the above described step (d1) of the second aging treatment is the step (e1), in which the precipitates of the rare earth carbonate in the aqueous slurry after the second aging treatment are collected by subjecting the aqueous slurry to a suitable solid-liquid separation process such as filtration, centrifugation and the like and the thus collected precipitates are washed with water as completely as possible, dried and calcined to give a rare earth oxide powder which is excellently dispersible without agglomeration even by omitting the heretofore indispensable disintegration treatment. The conditions of this step (e1) can be conventional. For example, a dried powder of a rare earth carbonate can be converted into an oxide powder by the calcination at a temperature in the range from 600° to 1200° C. for 1 to 8 hours, preferably, in an oxidizing atmosphere or in air.

The inventive method according to the second aspect of the invention also comprises five essential steps of (a2) to (e2), of which the most characteristic is the step (c2) between the two aging steps of (b2) and (d2). This modified procedure of the inventive method is applicable when the aqueous slurry after the step (a2) or (b2) contains the precipitates of the rare earth carbonate in an amount in excess of 0.05 mole/liter calculated as the rare earth element. Such a high solid content of the aqueous slurry is a result of the relatively high concentrations of the starting aqueous solution of the inorganic rare earth salt and/or the aqueous solution of the alkaline carbonate.

Namely, the aqueous slurry of the rare earth carbonate after steps (a2) and (b2), which can be performed under substantially identical conditions with those in steps (a1) and (b1), respectively, is admixed and diluted, instead of the addition of an additional amount of the inorganic rare earth salt, with water in such an amount that the solid content of the aqueous slurry after dilution does not exceed 0.05 mole/liter or, preferably, in the range from 0.01 to 0.03 mole/liter calculated as the rare earth element. The thus diluted aqueous slurry of the rare earth carbonate is then subjected to the second aging treatment in step (d2) and separation of the precipitates of the rare earth carbonate followed by washing with water, drying and calcination of the same substantially in step (e2) each in the same manner as in steps (d1) and (e1), respectively, described above.

A further modification of the inventive method according to the third aspect of the invention is described below.

Thus, the aqueous slurry of the rare earth carbonate after the step (a3) or (b3), which can be performed in substantially the same manner as in steps (a1) and (b1), respectively, has a pH of 7.5 or higher or, in most cases, has a pH in the range from 7.5 to 9.0 as a consequence of the addition of an excess amount of the water-soluble alkaline carbonate. In step (c3) of the method preceding step (d3) for the second aging treatment of the carbonate precipitates, accordingly, the aqueous slurry is admixed, instead of the admixture of an additional amount of the inorganic rare earth salt in step (c1) or dilution with addition of water in step (c2), with an inorganic acid in such an amount that the pH of the aqueous slurry is lowered not to exceed 7.5 or, preferably, in the range from 5.5 to 7.5. Though not particularly limitative, the inorganic acid to be added to the aqueous slurry in this step (c3) is preferably the same acid as used in the preparation of the starting aqueous solution of the inorganic rare earth salt by dissolving the oxide of the rare earth element in an acid. When the pH of the aqueous slurry after the pH adjustment is too high, an unduly long time is taken for the conversion of the amorphous carbonate particles into fine particles with crystallinity in the second aging treatment in step (d3).

The aqueous slurry of the rare earth carbonate after the pH adjustment in step (c3) is then subjected to the second aging treatment in step (d3) and further to the finishing treatment in step (e3), each step being carried out under substantially the same conditions as in steps (d1) and (e1), respectively, described above.

In the following, the method of the present invention is illustrated in more detail by way of examples, of which Examples i to 3 are each for the procedure according to the first aspect of the invention, Examples 4 to 6 are according to the second aspect and Examples 7 to 9 are according to the third aspect of the invention, and comparative examples.

EXAMPLE 1

An aqueous solution of lanthanum nitrate in a concentration of 0.2 mole/liter as lanthanum and having a pH of 3 was prepared by dissolving lanthanum oxide in nitric acid and 1 liter of this nitrate solution was admixed under agitation at room temperature with 1 liter of an aqueous solution containing 79 g (1 mole) of ammonium hydrogen carbonate to give an aqueous slurry of lanthanum carbonate. The amount of the ammonium hydrogen carbonate added to the nitrate solution was in excess by 67% over the stoichiometrically equivalent amount to the lanthanum nitrate.

The thus obtained aqueous slurry of lanthanum carbonate was heated at 50° C. for 2 hours to effect aging of the carbonate precipitates which were converted from a very fine powdery form into relatively coarse amorphous particles of about 10 $\mu$m particle diameter.

In the next step, the aqueous slurry of lanthanum carbonate after aging was admixed with 300 ml of the same aqueous solution of lanthanum nitrate as used in the starting step followed by a heating treatment at 80° C. for 3 hours to effect further aging of the carbonate precipitates.

The aqueous slurry of lanthanum carbonate was subjected to filtration to collect the precipitates of lanthanum carbonate which were then thoroughly washed with water, dried at 90° C. taking 16 hours and finally calcined at 800° C. for 2 hours to be converted into a powder of lanthanum oxide consisting of particles of about 0.9 $\mu$m diameter without agglomerates exhibiting excellent dispersibility even without undertaking disintegration.

Comparative Example 1

The experimental procedure was substantially the same as in Example 1 except that the volume of the aqueous solution of ammonium hydrogen carbonate added to the aqueous solution of lanthanum nitrate was decreased to 600 ml so that the amount of the ammonium hydrogen carbonate added was stoichiometrically just equivalent to the lanthanum nitrate.

The thus obtained lanthanum oxide powder contained gross agglomerates and required disintegration in order to obtain an oxide powder having good dispersibility.

Comparative Example 2

The experimental procedure was substantially the same as in Example 1 except that the first aging treatment by heating at 50° C. was omitted.

The thus obtained lanthanum oxide powder contained gross agglomerates and required disintegration in order to obtain an oxide powder having good dispersibility.

Comparative Example 3

The experimental procedure was substantially the same as in Example 1 except that the additional admixture of 300 ml of the aqueous solution of lanthanum nitrate was not undertaken after the first aging treatment.

The thus obtained lanthanum oxide powder contained gross agglomerates and required disintegration in order to obtain an oxide powder having good dispersibility.

Example 2

The experimental procedure was substantially the same as in Example 1 except that the aqueous solution of lanthanum nitrate used in two portions of, first, 1 liter and, second, 300 ml was replaced with the same volume of an aqueous solution of neodymium nitrate in the same molar concentration.

The thus obtained powder of neodymium oxide consisted of particles of about 0.7 μm diameter without agglomerates exhibiting excellent dispersibility even without undertaking disintegration.

Example 3

The experimental procedure was substantially the same as in Example 1 except that the aqueous solution of lanthanum nitrate used in two portions of, first, 1 liter and, second, 300 ml was replaced with the same volumes of an aqueous solution of terbium nitrate in the same molar concentration.

The thus obtained powder of terbium oxide consisted of particles of about 1.5 μm diameter without agglomerates exhibiting excellent dispersibility even without undertaking disintegration.

Example 4

An aqueous solution of lanthanum nitrate in a concentration of 0.2 mole/liter as lanthanum and having a pH of 3 was prepared by dissolving lanthanum oxide in nitric acid and i liter of this nitrate solution was admixed under agitation at room temperature with I liter of an aqueous solution containing 79 g (1 mole) of ammonium hydrogen carbonate to give an aqueous slurry of lanthanum carbonate. The amount of the ammonium hydrogen carbonate added to the nitrate solution was in excess of 67% over the stoichiometrically equivalent amount to the lanthanum nitrate.

The thus obtained aqueous slurry of lanthanum carbonate was heated at 50° C. for 2 hours to effect aging of the carbonate precipitates which were converted from a very fine powdery form into relatively coarse amorphous particles of about 10 μm particle diameter.

In the next step, the aqueous slurry of lanthanum carbonate after aging was admixed with 2 liters of water so as to decrease the content of lanthanum carbonate in the slurry to 0.05 mole/liter calculated for the lanthanum element followed by a heating treatment at 80° C. for 3 hours to effect further aging of the carbonate precipitates.

The subsequent procedure was substantially the same as in Example 1 to obtain a powder of lanthanum oxide consisting of particles of about 0.9 μm diameter without agglomerates exhibiting excellent dispersibility even without undertaking disintegration.

Comparative Example 4

The experimental procedure was substantially the same as in Example 4 except that the volume of the aqueous solution of ammonium hydrogen carbonate added to the aqueous solution of lanthanum nitrate was decreased to 600 ml so that the amount of the ammonium hydrogen carbonate added was stoichiometrically equivalent to the lanthanum nitrate.

The thus obtained lanthanum oxide powder contained gross agglomerates and required disintegration in order to obtain an oxide powder having good dispersibility.

Comparative Example 5

The experimental procedure was substantially the same as in Example 4 except that the first aging treatment by heating at 50° C. was omitted.

The thus obtained lanthanum oxide powder contained gross agglomerates and required disintegration in order to obtain an oxide powder having good dispersibility.

Comparative Example 6

The experimental procedure was substantially the same as in Example 4 except that the additional admixture of 2 liters of water was not undertaken.

The thus obtained lanthanum oxide powder contained gross agglomerates and required disintegration in order to obtain an oxide powder having good dispersibility.

Example 5

The experimental procedure was substantially the same as in Example 4 except that the aqueous solution of lanthanum nitrate used in two portions of, first, 1 liter and, second, 300 ml was replaced with the same volumes of an aqueous solution of neodymium nitrate in the same molar concentration.

The thus obtained powder of neodymium oxide consisted of particles of about 1.5 μm diameter without agglomerates exhibiting excellent dispersibility even without undertaking disintegration.

Example 6

The experimental procedure was substantially the same as in Example 1 except that the aqueous solution of lanthanum nitrate used in two portions of, first, 1 liter and, second, 300 ml was replaced with the same volumes of an aqueous solution of terbium nitrate in the same molar concentration.

The thus obtained powder of terbium oxide consisted of particles of about 1.9 μm diameter without agglomerates exhibiting excellent dispersibility even without undertaking disintegration.

Example 7

An aqueous solution of lanthanum nitrate in a concentration of 0.2 mole/liter as lanthanum and having a pH of 3 was prepared by dissolving lanthanum oxide in nitric acid and 1 liter of this nitrate solution was admixed under agitation at room temperature with 1 liter of an aqueous solution containing 79 g (1 mole) of ammonium hydrogen carbonate to give an aqueous slurry of lanthanum carbonate. The amount of the ammonium hydrogen carbonate added to the nitrate solution was in excess of 67% over the stoichiometrically equivalent amount to the lanthanum nitrate.

The thus obtained aqueous slurry of lanthanum carbonate was heated at 50° C. for 2 hours to effect aging of the carbonate precipitates which were converted from a very fine powdery form into relatively coarse amorphous particles of about 10 μm particle diameter.

In the next step, the aqueous slurry of lanthanum carbonate after aging having a pH of 8.1 was admixed with a small volume of nitric acid so as to decrease the pH to 7.0 followed by a heating treatment at 80° C. for 3 hours to effect further aging of the carbonate precipitates.

The subsequent procedure was substantially the same as in Example 1 to obtain a powder of lanthanum oxide consisting of particles of about 1.4 μm diameter without agglomerates exhibiting excellent dispersibility even without undertaking disintegration.

Comparative Example 7

The experimental procedure was substantially the same as in Example 7 except that the volume of the aqueous solution of ammonium hydrogen carbonate added to the aqueous solution of lanthanum nitrate was decreased to 600 ml so that the amount of the ammonium hydrogen carbonate added was stoichiometrically equivalent to the lanthanum nitrate.

The thus obtained lanthanum oxide powder contained gross agglomerates and required disintegration in order to obtain an oxide powder having good dispersibility.

Comparative Example 8

The experimental procedure was substantially the same as in Example 7 except that the first aging treatment by heating at 50° C. was omitted.

The thus obtained lanthanum oxide powder contained gross agglomerates and required disintegration in order to obtain an oxide powder having good dispersibility.

Comparative Example 9

The experimental procedure was substantially the same as in Example 7 except that the pH value of the aqueous slurry after the first aging treatment at 50° C. was not adjusted by the addition of nitric acid prior to the second aging treatment.

The thus obtained lanthanum oxide powder contained gross agglomerates and required disintegration in order to obtain an oxide powder having good dispersibility.

Example 8

The experimental procedure was substantially the same as in Example 7 except that the aqueous solution of lanthanum nitrate used in two portions of, first, 1 liter and, second, 300 ml was replaced with the same volumes of an aqueous solution of neodymium nitrate in the same molar concentration. The aqueous slurry after the first aging treatment at 50° C. had a pH of 7.9 which was adjusted to 7.0 by the addition of nitric acid.

The thus obtained powder of neodymium oxide consisted of particles of about 0.9 μm diameter without agglomerates exhibiting excellent dispersibility even without undertaking disintegration.

Example 9

The experimental procedure was substantially the same as in Example 7 except that the aqueous solution of lanthanum nitrate used in two portions of, first, 1 liter and, second, 300 ml was replaced with the same volumes of an aqueous solution of terbium nitrate in the same molar concentration. The aqueous slurry after the first aging treatment at 50° C. had a pH of 7.9 which was adjusted to 7.0 by the addition of nitric acid.

The thus obtained powder of terbium oxide consisted of particles of about 1.8 μm diameter without agglomerates exhibiting excellent dispersibility even without undertaking disintegration.

What is claimed is:

1. A method for the preparation of a powder of a rare earth oxide which comprises the successive steps of:
   (a) admixing an aqueous solution of an inorganic salt of a rare earth element with an aqueous solution of a water-soluble alkaline carbonate in a concentration of 5 to 25% by weight at a temperature in a range of from 0 to 50° C., wherein the alkaline carbonate is present in an amount in excess of from 20 to 100% over the stoichiometrically equivalent amount to effect complete precipitation of the rare earth element in the aqueous solution, to form an aqueous slurry containing precipitates of a carbonate of the rare earth element;
   (b) aging the aqueous slurry containing the precipitates of the carbonate of the rare earth element at a temperature of 50° C. or higher for at least 60 minutes;
   (c) admixing the aqueous slurry after step (b) with an additional amount of the aqueous solution of the inorganic salt of the rare earth element in an amount in the range of from one fifth to one-half of the amount of the inorganic salt of the rare earth element contained in the aqueous solution in step (a);
   (d) heating the aqueous slurry after step (c) at a temperature of 60° C. or higher for at least 60 minutes; and
   (e) subjecting the aqueous slurry after step (d) to solid-liquid separation to collect the precipitates of the carbonate of the rare earth element, followed by washing with water, drying and calcining the carbonate of the rare earth element to form rare earth oxide powder.

2. A method for the preparation of a powder of a rare earth oxide which comprises the successive steps of:
   (a) admixing an aqueous solution of an inorganic salt of a rare earth element in a concentration of at least 0.2 moles/liter based on the rare earth element with an aqueous solution of a water-soluble alkaline carbonate in a concentration of 5 to 25% by weight at a temperature in a range of from 0° to 50° C., wherein the alkaline carbonate is present in an amount in excess of from 20% to 100% over the stoichiometrically equivalent amount to effect complete precipitation of the rare earth element in the aqueous solution, to form an aqueous slurry containing precipitates of a carbonate of the rare earth element;

(b) aging the aqueous slurry containing the precipitates of the carbonate of the rare earth element at a temperature of 50° C. or higher for at least 60 minutes;

(c) admixing the aqueous slurry after step (b) with water in such an amount that the content of the carbonate of the rare earth element therein does not exceed 0.05 mole/liter based on the rare earth element;

(d) heating the aqueous slurry after step (c) at a temperature of 60° C. or higher for at least 60 minutes; and (e) subjecting the aqueous slurry after step (d) to solid-liquid separation to collect the precipitates of the carbonate of the rare earth element, followed by washing with water, drying and calcining of the carbonate of the rare earth element to form rare earth oxide powder.

3. A method for the preparation of a powder of a rare earth oxide which comprises the successive steps of:

(a) admixing an aqueous solution of an inorganic salt of a rare earth element with an aqueous solution of a water-soluble alkaline carbonate in a concentration of 5 to 25% by weight at a temperature in a range of from 0° to 50° C., wherein the alkaline carbonate is present in an amount in excess of from 20% to 100% over the stoichiometrically equivalent amount to effect complete precipitation of the rare earth element in the aqueous solution, to form an aqueous slurry containing precipitates of a carbonate of the rare earth element;

(b) aging the aqueous slurry containing the precipitates of the carbonate of the rare earth element at a temperature of 50° C. or higher for at least 60 minutes;

(c) admixing the aqueous slurry after step (b) with an inorganic acid in such an amount that the aqueous slurry has a pH not higher than 7.5;

(d) heating the aqueous slurry after step (c) at a temperature of 60° C. or higher for at least 60 minutes; and (e) subjecting the aqueous slurry after step (d) to solid-liquid separation to collect the precipitates of the carbonate of the rare earth element, followed by washing with water, drying and calcining the carbonate of the rare earth element to form rare earth oxide powder.

* * * * *